United States Patent
Oh (10) Patent No.: US 8,301,207 B2
(45) Date of Patent: Oct. 30, 2012

(54) SEPARABLE MOBILE TERMINAL AND METHOD OF OPERATION

(75) Inventor: Hee-Jin Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 12/641,668

(22) Filed: Dec. 18, 2009

(65) Prior Publication Data

US 2010/0160002 A1 Jun. 24, 2010

(30) Foreign Application Priority Data

Dec. 19, 2008 (KR) .................. 10-2008-0130725

(51) Int. Cl.
*H04B 1/38* (2006.01)
*H04M 1/00* (2006.01)

(52) U.S. Cl. ............... 455/573; 455/572; 455/343.1; 455/343.2; 455/343.5; 429/9; 429/50; 429/51; 320/135

(58) Field of Classification Search .......... 455/572, 455/573, 343.1, 343.2, 343.5; 429/9, 50, 429/51; 320/135
See application file for complete search history.

(56) References Cited

U.S. PATENT DOCUMENTS

| | | | | |
|---|---|---|---|---|
| 6,266,539 | B1 * | 7/2001 | Pardo | 455/556.2 |
| 2001/0012761 | A1 * | 8/2001 | Mitama et al. | 455/41 |
| 2004/0185902 | A1 * | 9/2004 | Yang | 455/557 |
| 2005/0113157 | A1 * | 5/2005 | Jaakola | 455/575.6 |
| 2005/0116686 | A1 * | 6/2005 | Odaohhara | 320/116 |
| 2007/0135182 | A1 * | 6/2007 | Hanif et al. | 455/575.1 |

FOREIGN PATENT DOCUMENTS

KR 10-2005-0077409 8/2005

* cited by examiner

*Primary Examiner* — Tuan Pham (74) *Attorney, Agent, or Firm* — Stanzione & Kim, LLP (57) ABSTRACT

A separable mobile terminal device includes a main module to execute main functions in order to drive a mobile terminal and a user module to inform a user of visual and aural elements. At least one of the main module and the user module has a control unit to determine whether to execute the interworking between the main module and the user module depending on whether the main module and the user module are connected and whether the interworking between the main module and the user module is required. Each of the main module and the user module has an interface unit to enable data transmission/reception between the modules, and a battery to supply driving power to each respective module. Each of the main module and the user module has a connection means, so that the main module and the user module can be connected with or separated from each other via the connection means.

34 Claims, 9 Drawing Sheets

SEPARABLE MOBILE TERMINAL AND METHOD OF OPERATION

CROSS-REFERENCE TO RELATED APPLICATIONS

This application claims the priority under 35 U.S.C. §119(a) of an application entitled "Separable Mobile Terminal And Method Thereof" filed in the Korean Industrial Property Office on Dec. 19, 2008 and assigned Serial No. 10-2008-0130725, the contents of which are hereby incorporated by reference in their entirety.

BACKGROUND

1. Field of the Invention

The present general inventive concept relates to a mobile terminal device and method in a mobile communication system, and more particularly to a separable mobile terminal device and method in a mobile communication system 2. Description of the Related Art Typically, a portable terminal is an apparatus which can be personally carried so as to transmit/receive voice and data irrespective of time and place. Examples of portable terminals include a portable telephone, a WAP (Work Analysis Program) phone, a PDA (Personal Digital Assistants), a web pad, etc., and portable terminals are used by a large number of people since individual services available to users increase the mobility of the portable terminals.

Figure 1:
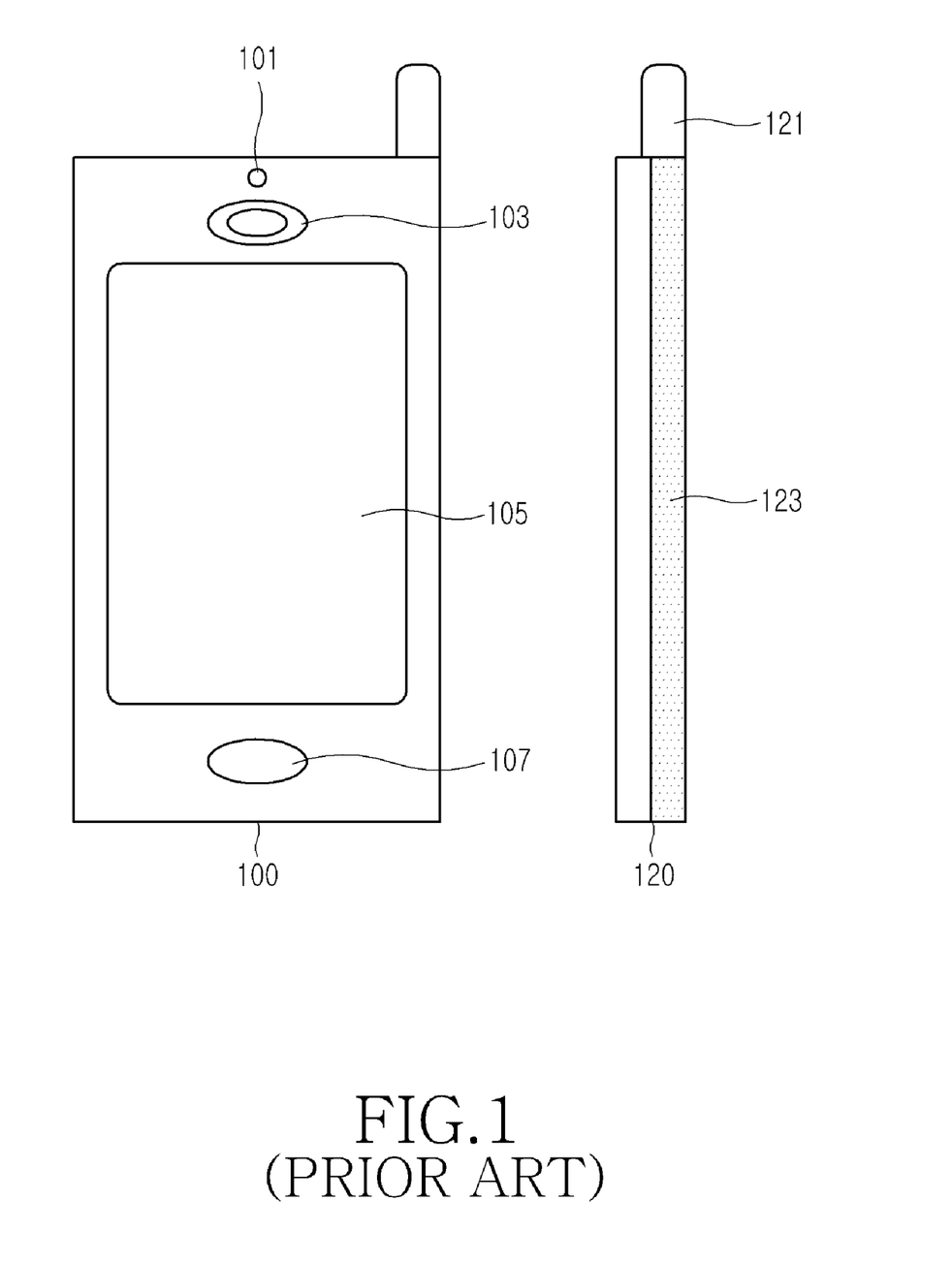
FIG. 1 shows the external appearance of a portable terminal according to the prior art.

FIG. 1 shows an external appearance of a portable terminal according to the prior art.

At first, referring to the front side 100 and the right side 120 of the mobile terminal, the portable terminal includes a camera 101, a speaker 103, a user interface unit 105, a microphone 107, an antenna 121, and a battery 123.

Such a mobile terminal receives services, such as broadcasting services and content, through portable terminal service providers or Internet web sites. However, as the processing rates of processors provided in such mobile terminals have rapidly improved, and terminal users' demands for services have increased, mobile terminal manufacturers and mobile communication service providers have actively developed hardware integration techniques and high-performance main processors to meet the improved processing rates and the increased users' demands.

According to the development of the hardware integration and high performance main processors, various functions, such as an mp3 function, a DMB function, and an image communication function, may be integrated in a single mobile terminal. However, as the hardware integrity and the calculation capabilities of main processors have increased, the mobile terminals have begun to generate more heat, which may be uncomfortable or inconvenient for users. In addition, as the functions of portable terminals have diversified, the portables terminals may increase in weight, which also is inconvenient for users. Furthermore, strong electromagnetic waves generated from an antenna may affect the users' health.

SUMMARY

Accordingly, the present general inventive concept provides a mobile terminal device and method, wherein the mobile terminal is separated into a main module and a user module according to functional characteristics thereof, and the main module and the user module can be separately used.

In addition, the present general inventive concept provides a mobile terminal device and method, wherein the mobile terminal is separated into a main module and a user module according to functional characteristics thereof, each of which is provided with a battery, and the batteries can be compatibly used and can charge one another.

In addition, the present general inventive concept provides a mobile terminal device and method, wherein the mobile terminal is separated into a main module and a user module according to functional characteristics thereof, and an interface is added to connect the main module and the user module which are separated from each other.

Moreover, the present general inventive concept provides a mobile terminal device and method, wherein the mobile terminal is separated into a main module and a user module according to functional characteristics thereof, and the main module and the user module are configured to be capable of being connected with each other through a wired/wireless interface.

Additional aspects and utilities of the present general inventive concept will be set forth in part in the description which follows and, in part, will be obvious from the description, or may be learned by practice of the general inventive concept.

Features and/or utilities of the present general inventive concept may be realized by a main module to execute main functions to drive the mobile terminal and a user module to inform a user of visual and aural elements. At least one of the main module and the user module may include a control unit to determine whether to communicate between the main module and the user module depending on whether the main module and the user module are connected, and whether interworking between the main module and the user module is required. Each of the main module and the user module may have an interface unit to enable data transmission/reception and a battery to supply driving power, and each of the main module and the user module may have a connection means, so that the main module and the user module can be connected with or separated from each other via the connection means.

Features and/or utilities of the present general inventive concept may also be realized by a method of executing the interworking between a main module and a user module in a mobile terminal in which the main module and the user module are separable from each other, the main module executes principal functions to drive the mobile terminal, and the user module informs a user of visual and aural elements. The method may include confirming the connection state between the main module and the user module, determining whether the interworking between the main module and the user module is required depending on an operation request input by a user, and determining whether to execute the interworking between the main module and the user module depending on the confirmed connection state and the determination as to the requirement of the interworking.

Features and/or utilities of the present general inventive concept may be realized by a mobile device including a main module including a battery to power the main module and a first connector and a user module including a battery to power the user module and a second connector to connect to the first connector. The user module may include hardware components to receive as input and to output at least one of audio and visual signals from/to a user, and the main module may include hardware components to receive, process, and store data.

The main module may include neither audio nor visual input/output hardware to receive input from or to output signals to a user.

At least one of the main module and the user module may include a controller to control a transfer of power between the main module battery and the user module battery.

The controller may control operation of the main module and the user module based on received commands.

The controller may determine whether to transfer power between the main module battery and the user module battery by comparing a threshold power ratio to a measured power ratio. The threshold power ratio is a predetermined number representing a ratio of power of the main module to power of the user module, and the measured power ratio is a measured ratio of power of the main module battery to power of the user module battery.

The controller may adjust the threshold power ratio based on an operation being executed by the mobile device.

The controller may determine whether to transfer power between the main module battery and the user module battery by comparing a threshold number of charging operations to a measured number of charging operations. The threshold number of charging operations may be a predetermined number of charging operations between the main module battery and the user module battery in a predetermined period of time, and the measured number of charging operations may be a measured number of charging operations between the main module battery and the user module battery within the predetermined period of time.

The controller may adjust the threshold number of charging operations based on an operation being executed by the mobile device.

The main module may further include a controller to control operation of at least the main module, memory, and an antenna to transmit wireless signals.

The user module may further include a control unit to control operation of at least the user module, a camera, a visual display, and at least one audio transmitter to transmit and receive audio signals.

The user module may have a front surface including at least one of said hardware components to receive/transmit at least one of audio and visual signals from/to a user and a rear surface opposite the front surface, the rear surface including the second connector, and the main module may have a first surface including the first connector and having a shape corresponding to a shape of the rear surface of the user module such that when the user module is connected to the main module via the first and second connectors, the rear surface of the user module fits onto the first surface of the main module.

Features and/or utilities of the present general inventive concept may also be realized by a method of charging a first and second battery, the method including measuring a ratio of power of a first battery to power of a second battery, comparing the measured ratio to a predetermined threshold ratio, and charging one of the first and second battery with the other of the first and second battery based on an outcome of the comparison. The method may further include, when the measured ratio is greater than the threshold ratio, charging the first battery with the second battery, and, when the measured ratio is less than the threshold ratio, charging the second battery with the first battery.

The threshold ratio may include a first ratio value and a second ratio value less than the first ratio value, and the method may further include, when the measured ratio is greater than the first ratio value, charging the first battery with the second battery, and, when the measured ratio is less than the second ratio value, charging the second battery with the first battery.

The threshold ratio may be determined by a user. Alternatively, the threshold ratio may be determined by an operation being executed by a device connected to at least one of the first and second batteries.

The first battery may be connected to a user module of a mobile device and the second battery may be connected to a main module of the mobile device.

The method may further include detecting whether the user module is connected to the main module before measuring the ratio of power of the first battery to the ratio of power of the second battery.

The method may further include comparing a number of charging operations performed within a predetermined time period to a predetermined number, and performing the charging operation only if the number of charging operations performed is less than the predetermined number.

The predetermined number may be set by a user. Alternatively, the predetermined number may be adjusted based on an operation being performed by a device connected to at least one of the first and second batteries.

Features and/or utilities of the present general inventive concept may also be realized by a method of charging a first and second battery, the method including comparing a number of charging operations performed between a first battery and a second battery within a predetermined time period to a predetermined number, and performing a charging operation between the first battery and the second battery only if the number of charging operations performed is less than the predetermined number.

Features and/or utilities of the present general inventive concept may also be realized by a method of operating a mobile device including a user interface portion having a first battery and a support portion having a second battery, the user interface portion being separable from the support portion. The method may include receiving a command from a user via the user interface portion, determining whether an operation corresponding to the command requires use of the support portion, and if the operation does not require use of the support portion, executing the command with only the user interface portion.

BRIEF DESCRIPTION OF THE DRAWINGS

The above and other aspects, features and advantages of the present general inventive concept will be more apparent from the following detailed description taken in conjunction with the accompanying drawings, in which.

DETAILED DESCRIPTION OF THE EMBODIMENTS

Hereinafter, exemplary embodiments of the present general inventive concept will be described with reference to the accompanying drawings. In the following description, the same members will be designated by the same reference numerals although they are shown in different drawings. Further, in the following description of the present general inventive concept, a detailed description of known functions and configurations incorporated herein will be omitted when it may make the subject matter of the present general inventive concept rather unclear.

Conventionally, a mobile terminal includes a module to execute main functions to drive the mobile terminal (hereinafter, the module will be referred to as "main module"), and a module to transmit visual, tactile, and aural elements to/from a user (hereinafter, the module will be referred to as "user module"), and the main module and the user module may be connected.

Briefly explaining the basic concept of the present general inventive concept in consideration of the above-mentioned points, the present general inventive concept separates a mobile module into a main module and a user module according to the functional characteristics thereof. In addition, depending on whether connecting the separated main and user modules is required, and whether an input operation requires interworking of the main module and the user module, the interworking of the main and user modules may be turned on/off so as to execute the input operation.

In addition, when the main module and user module are in the connected state, the inter-charging of batteries between two modules is allowed. Such an operation may be executed by either of the main module and the user module. That is, the operation can be applied to a mobile terminal through a small modification of the present general inventive concept without departing from the scope of the present general inventive concept so far, which can be accomplished by the judgment of an ordinary skilled person in the art.

Hereinafter, an embodiment of the present general inventive concept will be described in which the mobile terminal is separated into a user module and a main module which may communicate with each other via wire or wirelessly.

Figure 2A:
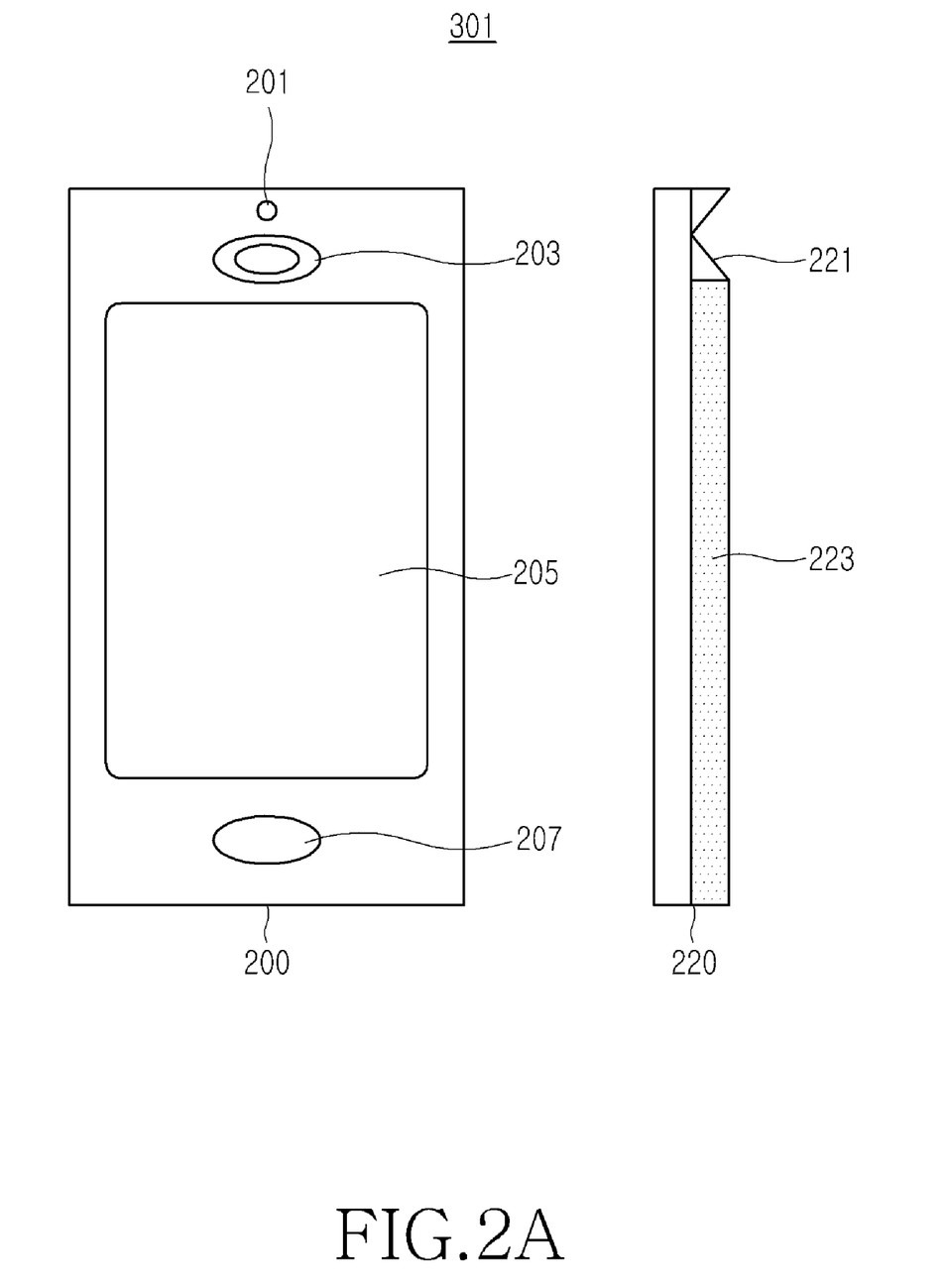
FIG. 2a shows a user module of a mobile terminal according to an embodiment of the present general inventive concept.
Figure 2B:
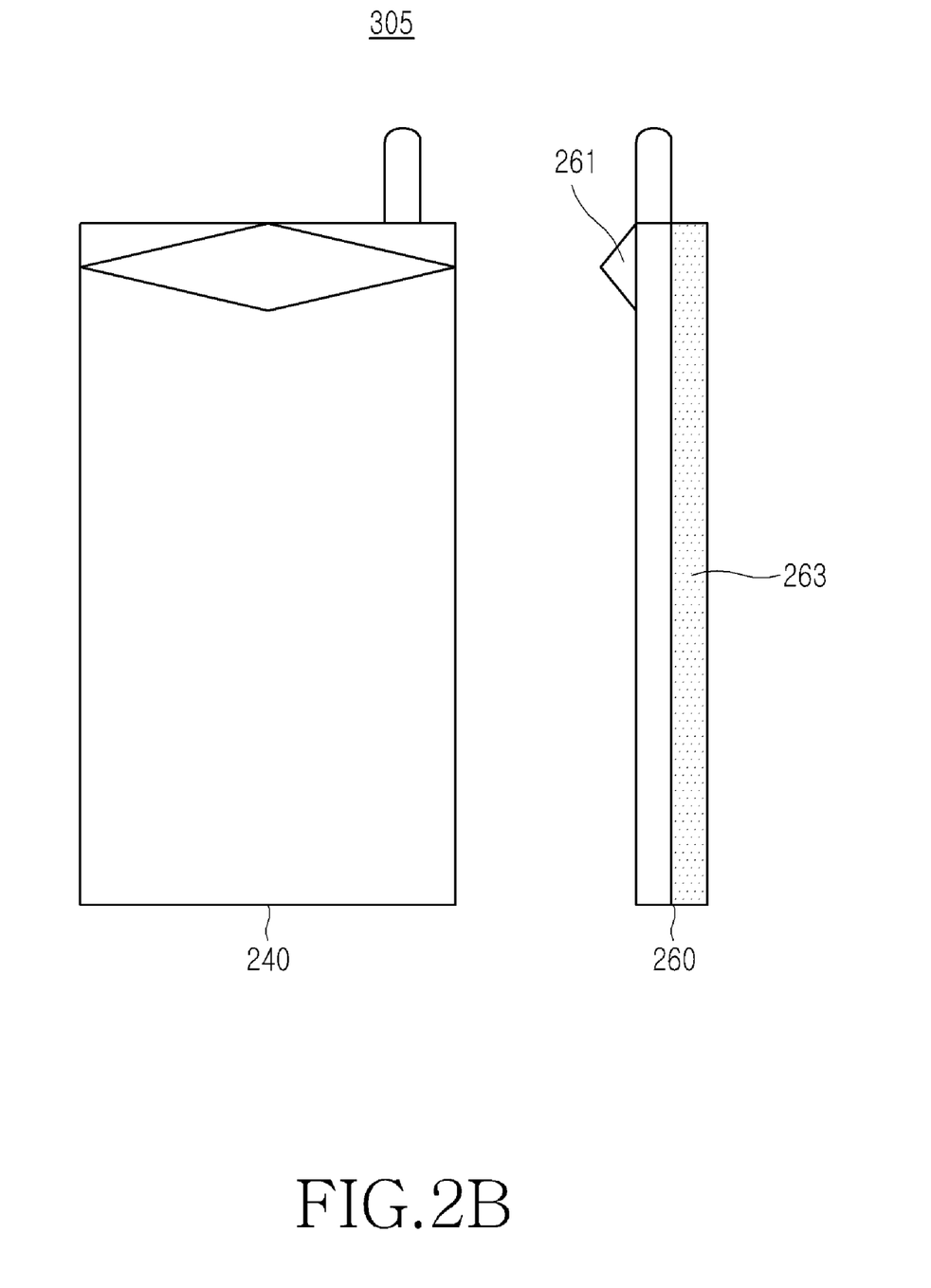
FIG. 2b shows a main module of the mobile terminal of the present general inventive concept.

FIG. 2a shows a user module of a mobile terminal according to an embodiment of the present general inventive concept, and FIG. 2a shows a main module of the mobile terminal.

FIG. 2a shows the front side 200 and the right side 220 of the user module 301. Referring to FIG. 2a, the user module 301 of the mobile terminal 300 has components directly operated by the user. For example, the user module 301 may include a camera 201, a speaker 203, a user interface unit 205, a microphone 207, a connection terminal 221, and a battery 223. The user interface unit 205 is a means to receive information input by the user or outputting the information to the user. For example, the user interface unit 205 may include a keypad and a display means. FIG. 2a illustrates an example in which the user interface unit 205 is implemented by a touch screen. However, it is possible to configure the user interface unit 205 in a form that a keypad and a display means are separately mounted on the mobile terminal.

FIG. 2b shows the front side and the right side 260 of the main module 305. Referring to FIG. 2b, the main module 305 has components required to operate the mobile terminal although they are not directly operated by the user. For example, the main module 305 may include a connection terminal 261, and a battery 263.

The connection terminal 221 in FIG. 2a and the connection terminal 261 in FIG. 2b may connect the user module 301 to the main module 305. In addition, the connection terminals 221, 261 may be electrically connected to each other to allow the user module 301 and the main module 305 to transfer data and/or power between the modules 301, 305. The electrical connection may be implemented through a connection means using pins or the like that are conventionally employed in electronic devices. Alternatively, any adequate connection means may be used, such as magnetic connections, wireless connections, physical latches or protrusions, etc.

Hereinafter, the connected state and the separated state of the user module and main module will be described individually, with reference to FIGS. 3a and 3b.

Figure 3A:
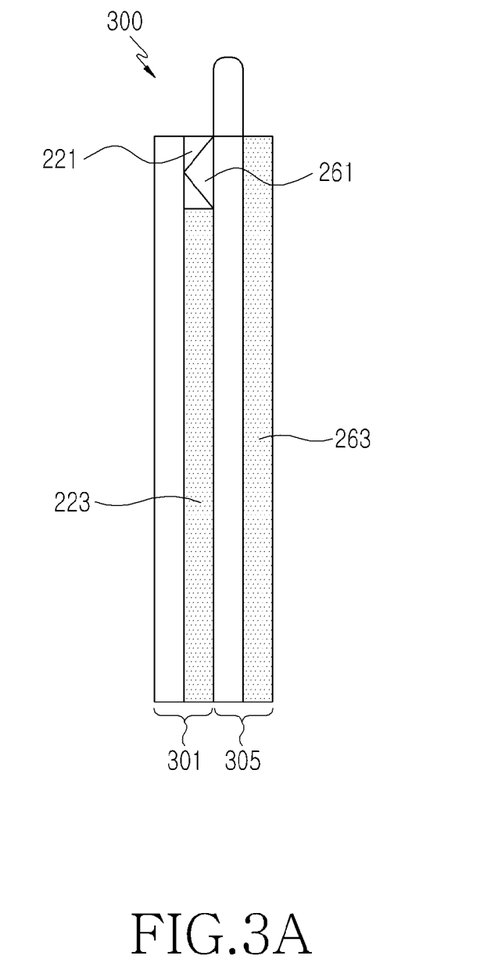
FIG. 3a shows the mobile terminal in the connected state.
Figure 3B:
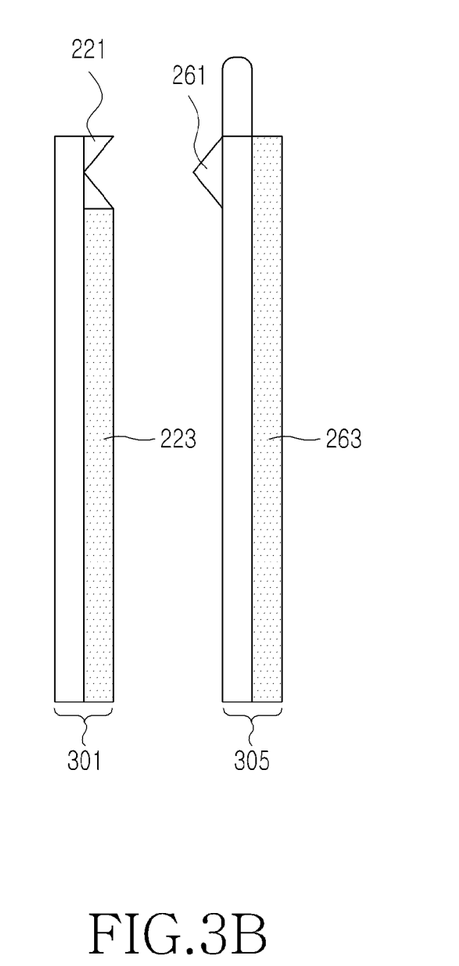
FIG. 3b shows the mobile terminal in the separated state.

FIG. 3a shows the user module 301 and the main module 305 in the connected state, and FIG. 3b shows the user module 301 and the main module 305 in the separated state.

Referring to FIG. 3a, the connection of the modules of the mobile terminal is accomplished by the connection means of the user module 301 and the main module 305. At this time, it can be appreciated that a user module battery 303 is attached to the user module 301, and a main module battery 307 is attached to the main module 305.

The user module battery 303 and the main module battery 307 may be shared by the user module 301 and the main module 305. That is, the user module battery 303 and the main module battery 307 may be compatibly used or inter-charged with each other.

In other words, when the user module 301 is separated from the main module 305, the user module 301 and main module 305 may be operated independently of each other to perform their respective functions. For example, the user module 301 may receive inputs and the main module 305 may receive and save or may transmit data.

Each module 301, 305 may be powered by its respective battery 303, 307. When the modules 301, 305 are connected, they may continue to be powered by their respective batteries 303, 307 or they may share the batteries 303, 307. For example, if the user module battery 303 is low, the main module battery 307 may power the user module 301. In addition, the main module battery 307 may charge the user module battery 303 so that the user module battery 303 continues to power the user module 301. A user may control settings to determine whether the batteries 303, 307 charge each other, whether the connected modules 301, 305 are powered separately by their respective batteries 303, 307, or whether one battery may power the other module when the battery of the other module is low. Alternatively, the battery control settings may be automatically configured without user input.

Referring to FIG. 3b, the separated state of the mobile terminal means state in which the mobile terminal is separated into the user module 301 and the main module 305. Here, the user module 301 and the main module 305 are provided with independent batteries, i.e. the user module battery 303, and the main module battery 307, respectively.

Figure 4:
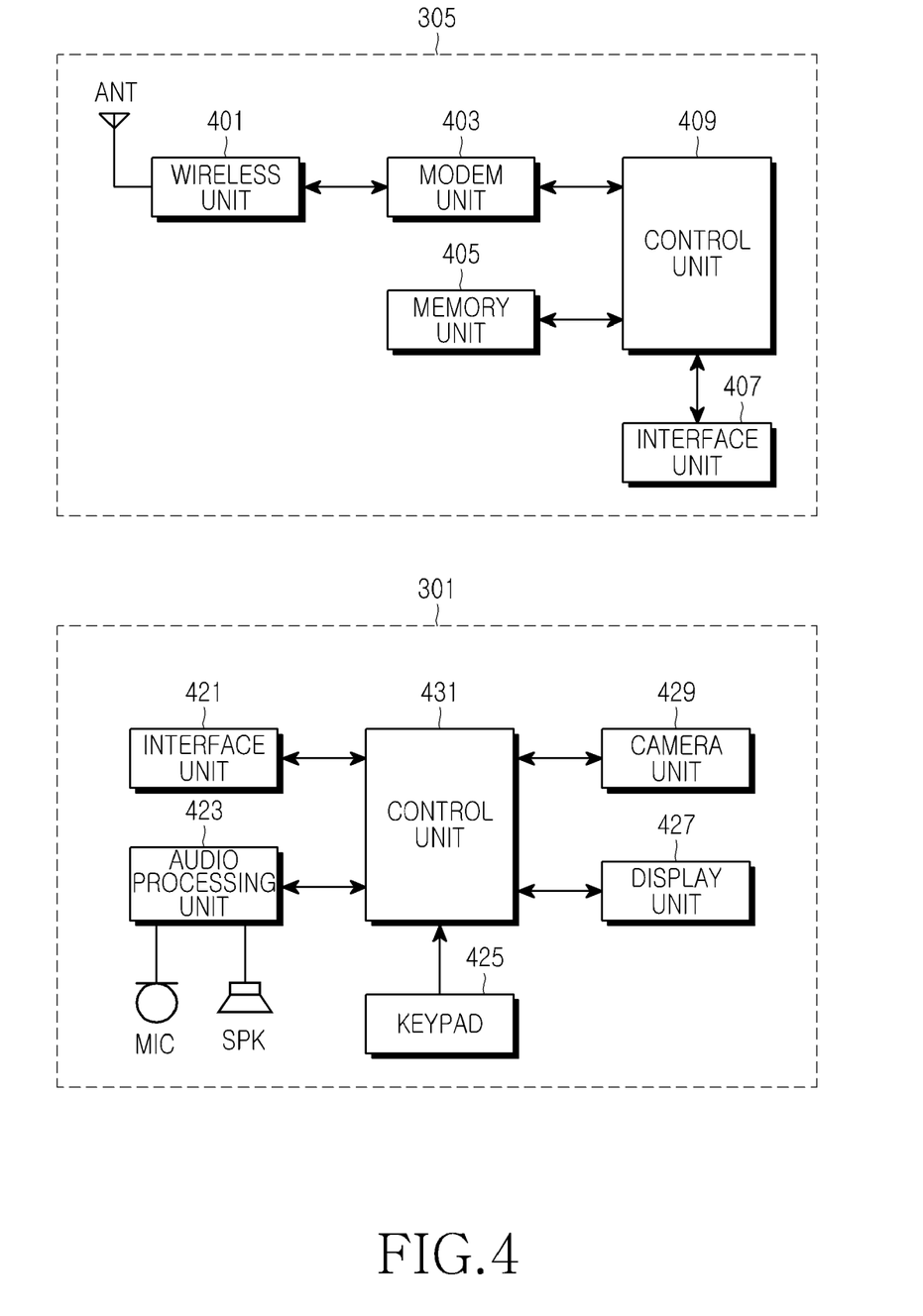
FIG. 4 shows the configuration of the portable terminal of the present general inventive concept.

FIG. 4 shows a configuration of a mobile terminal according to an embodiment of the present general inventive concept.

Referring to FIG. 4, the main module 305 of the mobile terminal 300 includes an antenna ANT, a wireless unit 401, a modem unit 403, a memory unit 405, a control unit 409, and an interface unit 407.

The wireless unit 401 transmits/receives data through the antenna ANT.

The modem unit 403 encodes/modulates or decodes/demodulates data transmitted or received through the wireless unit 401.

The memory unit 405 stores image information, sound information, data information, or the like.

The control unit 409 determines whether to execute the wireless interworking or not, depending on whether the main module 305 and the user module 301 are connected or not, and whether a requested operation requires the interworking between the main module 305 and the user module 301. In addition, when the main module 305 and the user module 301 are in the connected state, and as the batteries are used, the control unit 409 compares the remaining amount ratio of the batteries provided in the main module 305 and the user module 301 with a predetermined threshold, and then controls the batteries to inter-charge the batteries or to power the modules 301, 305 according to the battery power settings.

The interface unit 407 enables the main module 305 to execute data transmission/reception and interchange of battery power with the user module 301. At this time, it is possible to employ a wire interface or a wireless interface as the interface between the main module 305 and the user module 301. If the wire interface is employed, it is possible to transmit/receive data through a USB or the like. In the case of the wireless interface, it is possible to transmit/receive data using a wireless LAN, infrared communication, Bluetooth, an ad-hoc network or the like, but the present general inventive concept is not limited to these. This may be equally applied to the interface of the user module.

Meanwhile, the user module 301 of the mobile terminal includes an interface unit 421, an audio processing unit 423, a keypad 425, a camera unit 429, and a control unit 431.

The interface unit 421 enables the user module 301 to execute the data transmission/reception and interchange of battery power with the main module 305.

The audio processing unit 423 includes a speaker SPK to output sound, and a microphone MIC. That is, the audio processing unit 423 converts electric signals into audible signals and outputs the audible signals through the speaker SPK, or converts audible signals into electric signals and outputs the electric signals through the microphone MIC.

The keypad 425 allows the user to input data required to execute a requested operation through various keys.

The display unit 427 visually represents graphic images produced in the process of executing requested operation, and graphic images produced as the result of executing the requested operation.

The camera unit 429 drives a camera so as to enable photographing of still or moving images.

The control unit 432 controls the entire operations of the above-mentioned components of the user module 301.

FIG. 4 shows an example in which each of the main module 305 and the user module 301 includes a control unit. However, such a control unit may be provided only in any one of the main module and the user module.

Figure 5:
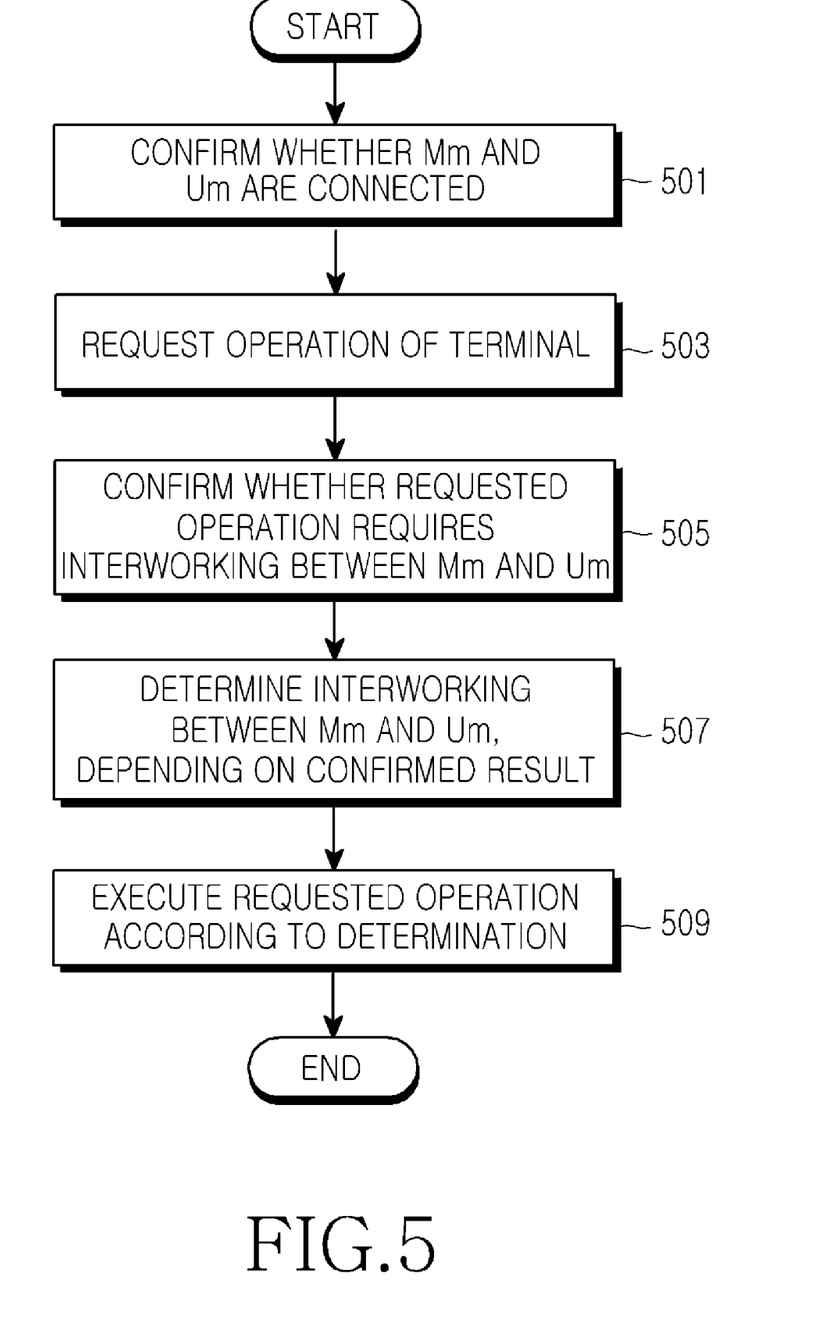
FIG. 5 is a flowchart showing a method of operating the mobile terminal of the present general inventive concept.

FIG. 5 is a flowchart showing a method of operating the mobile terminal 300. It should be noted that the flowchart of FIG. 5 illustrates the operations executed in a module having the control unit among the main module and the user module.

At first, in operation 501, the connection condition between the main module Mm and the user module Um is detected. At this time, the connection condition is periodically confirmed before a specific operation is requested, and the confirmed result is stored. If a specific operation of the terminal is requested in operation 503, it is determined in operation 505 whether the requested operation requires interworking between the main module and the user module in operation 505. Then, in operation 507, it is determined whether to execute the interworking between the main module and the user module, depending on the connection condition stored in the operation 501, and the determination in operation 505 as to whether the interworking is required. The requested operation is executed in operation 509 according to the determination of the operation 507.

Figure 6:
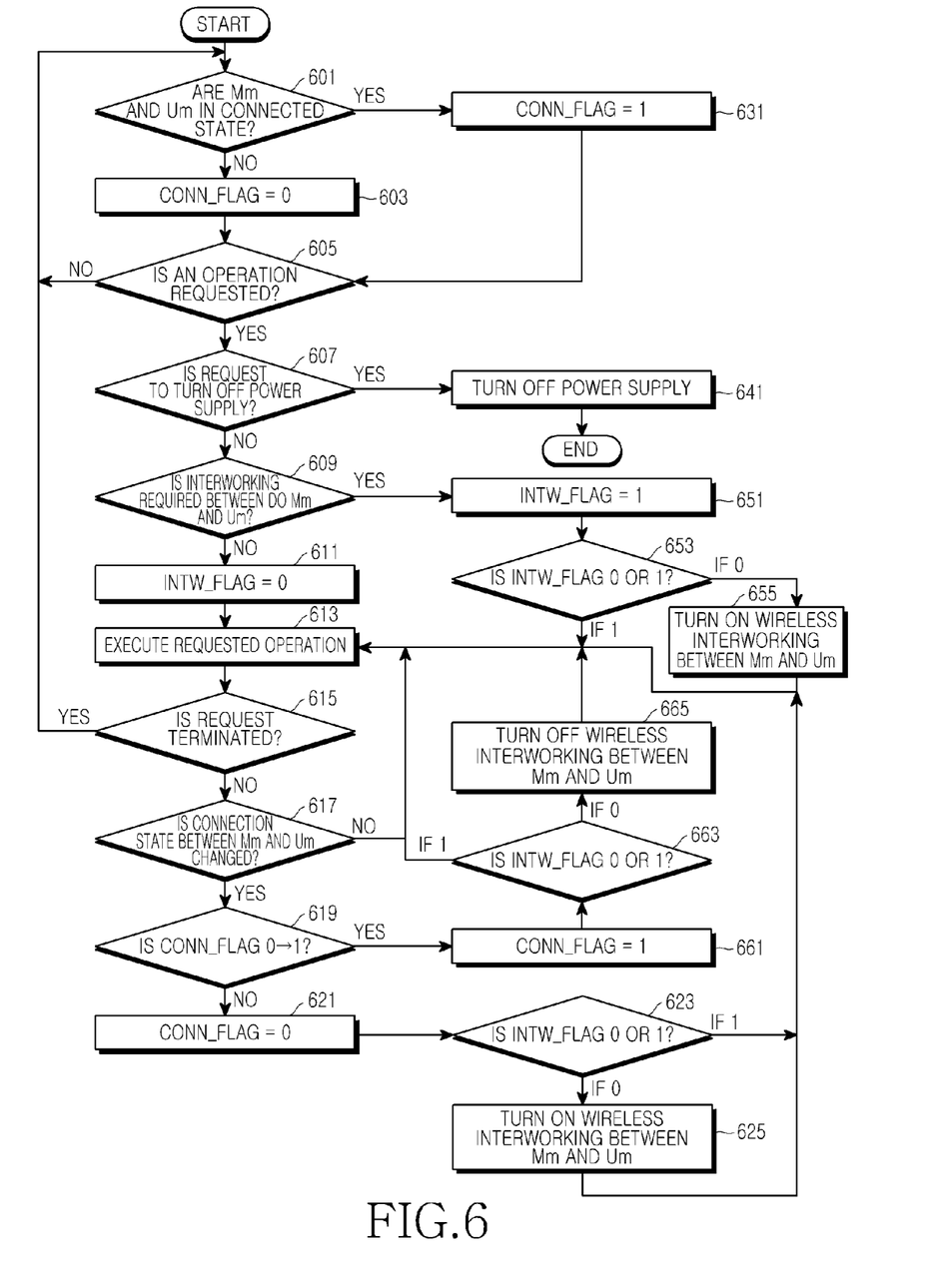
FIG. 6 is a flowchart showing a method of operating the mobile terminal of the present general inventive concept.

FIG. 6 is a flowchart showing a method of operating a mobile terminal according to an embodiment of the present general inventive concept.

It should be noted that the operation of the present general inventive concept described below with reference to FIG. 6 is explained assuming that the operation is executed by the control unit of the main module, and a wireless interface is used between the main module and the user module.

At first, in operation 601, the control unit of the main module Mm determines whether the main module is connected with the user module Um. Then, if the main module Mm is in the separated state, the connection flag Conn_flag is set to "0" in operation 603, and if the main module Mm is in the connected state, the connection flag Conn_flag is set to "1" in operation 631.

After the connection flag Conn_flag is set as described above, it is determined in operation 605 whether a specific operation is requested by the user in the operation 601. If no operation is requested, the process returns to the operation 601, and operations 601 to 605 are repeated.

In the operation 605, if it is determined that a specific operation is requested, it is determined in operation 607 whether the requested operation is a power-off operation. If the requested operation is a power-off operation, then the power is turned off in operation 641.

On the other hand, if the requested operation is not a power-off operation, the process proceeds to operation 609 and determines whether the requested operation is an operation requiring the interworking between the main module and the user module.

In the operation 609, if it is determined that the interworking is not required, the interworking flag Intw_flag is set to "0" in operation 611, and the process proceeds to operation 613, in which the operation requested in the operation 605 is executed.

On the other hand, if it is determined in the operation 609 that the interworking is required, the working flag Intw_flag is set to "1" in operation 651, and in operation 653, it is determined whether the connection flag Conn_flag is set to "0" or "1."

If the connection flag Conn_flag is set to "1," the process proceeds to the operation 613 and executes the operation requested in the operation 605. If the connection flag Conn_flag is set to "0," the wireless interworking between the main module and the user module is turned on in operation 655. Then, the process proceeds to the operation 613 and executes the operation requested in the operation 605.

After executing the requested operation, it is determined in operation 615 whether the operation request is terminated. If the operation request is terminated, the process proceeds to the operation 601 and repeats the above-mentioned steps.

If it is determined that the operation request is not terminated, it is determined whether the connection state between the main module and the user module is changed. If the connection state is changed, the process proceeds to operation 619 and confirms whether the set connection flag is changed from "1" to "0" or "0" to "1."

In the operation 619, if it is determined that the connection flag is changed from "1" to "0," the connection flag is changed and reset to "0" in operation 621.

If the connection flag is reset according to the change of the connection state in the operation 621, it is confirmed whether the interworking flag Intw_flag is set to "0" or "1" in operation 623. In the operation 623, if it is confirmed that the interworking flag is set to "1," the process proceeds to the operation 613, and repeats the above-mentioned steps. On the other hand, if the interworking flag Intw_flag is set to "0," the interworking between the main module and the user module is turned on in operation 625, and the process proceeds to the operation 613 and repeats the above-mentioned steps.

If the connection flag Conn_flag set in the operation 619 is changed from "0" to "1," the connection flag is changed and reset to "1" in operation 661.

If the resetting of the connection flag is completed according to the change of the connection state in the operation 661, it is determined in operation 663 whether the interworking flag Intw_flag is set to "0" or "1." If it is determined in the operation 663 that the interworking flag Intw_flag is set to "1," the process proceeds to the operation 613 and repeats the above-mentioned operations. If the interworking flag Intw_flag is set to "0," the wireless interworking between the main module and the user module is turned off in operation 665, and the process proceeds to the operation 613 and repeats the above-mentioned steps.

The requested operations in the above-mentioned inventive operations are the operations that the main module requests the user module to execute. However, if the above-mentioned inventive operations are executed by the user module, the user module serves to receive a user request input and to visually or aurally inform the user of the user request. Therefore, the requested operations may be principally the user requests.

The above operations may be performed or controlled by one or more controllers, such as processors, logic, and memory components. For example, one or both of the modules may include a processor, logic, and memory to detect user input, connection states, power levels of the batteries, etc.

If the main module and the user module of the mobile terminal are separately used depending on the functional characteristics of the inventive mobile terminal as described above, the convenience in moving and carrying the mobile terminal can be improved. As described above, the mobile terminal of the present general inventive concept may have a main module and a user module which are separable from each other and may have independent batteries. Thus, when the user module and the main module are in the separated state, each battery may supply power only to the corresponding module. An unbalance in the remaining amount of battery power may occur between the batteries of the two modules according to the consumed amount of power of the two modules. Therefore, in order to prevent the unbalance in the remaining amount of battery power, the present general inventive concept proposes a measure to allow the main module and the user module to execute inter-charging with reference to a threshold.

Figure 7:
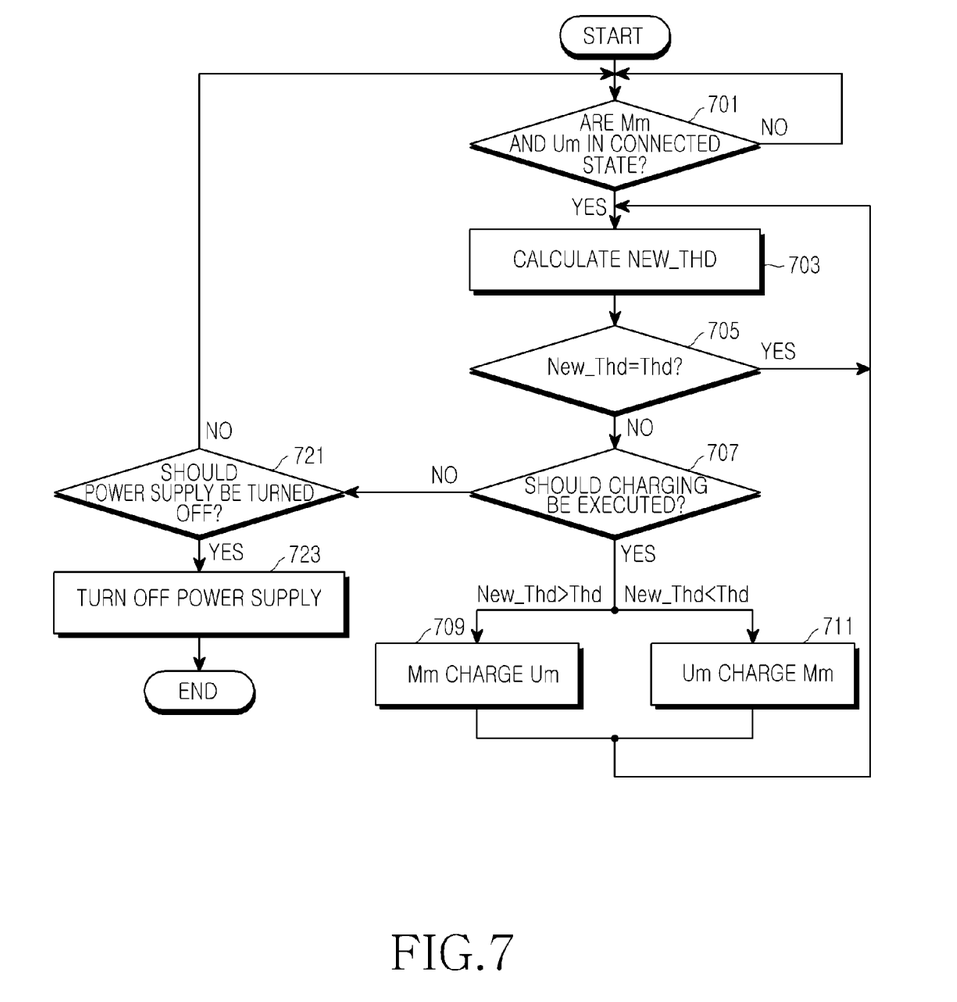
FIG. 7 is a flowchart showing a method of executing intercharging of batteries between the main module and the user module in a mobile terminal according to an embodiment of the present general inventive concept.

FIG. 7 is a flowchart showing a method of executing inter-charge of batteries between the main module and the user module according to the present general inventive concept.

At first, in operation 701, the connection state between the main module and the user module is determined. If the main module and the user module are in a separated state, or are disconnected from each other, it may be determined in operation 721 whether the a respective power supply of the respective modules should be turned off. The determination may be made based on a user command, a predetermined command or setting, a power level of the connected battery, etc. If it is determined that the power should be such off, it is shut off in operation 723. Otherwise, the process continues in operation 701 to detect whether the modules are connected.

On the other hand, if the main module and the user module are in the connected state, a threshold, New_Thd, is calculated in operation 703. New_Thd indicates the current remaining amount ratio of battery powers which have been changed as the batteries of the main module and the user module have been used, and New_Thd is changed in real time depending on executed operations. New_Thd may be expressed by Equation 1 below.

$$New\_Thd = \text{current remaining battery amount of } Mm / \text{current remaining battery amount of } Um. \quad \text{Equation 1}$$

Then, in operation 705, it is determined whether the calculated New_Thd and Thd are equal to each other. Thd is the reference value representing a ratio of battery power of the main module Mm and the user module Um. Thd is a preset ratio of battery power for the batteries of the main module Mm and the user module Um. In other words, Thd is a pre-set threshold value of the power in the module batteries that is compared with the actual ratio of power in the module batteries to determine whether to transfer power from one battery to the other. Although Thd is defined as a preset constant value, it can be fluctuated according to the operating environment of the mobile terminal. Thd may be expressed by Equation 2 below.

$$Thd = \text{remaining battery amount of } Mm / \text{remaining battery amount of } Um \quad \text{Equation 2}$$

If it is confirmed that New_Thd and Thd are equal to each other, the process proceeds to the operation 703 to continue calculating the value New_Thd.

Meanwhile, if New_Thd is not equal to Thd, it is determined in operation 707 whether to execute inter-charging between the batteries. If it is determined that the batteries should not inter-charge, then it is determined in operation 721 whether the power supply should be turned off. A determination as to whether the batteries should inter-charge may be based on power levels in the batteries, pre-determined settings set by a user, manufacturer, or vendor, or any other appropriate criteria.

When it is determined that the batteries should inter-charge, if New_Thd is larger than Thd, the battery provided in the user module Mm may be charged by the battery provided in the main module Mm in operation 709. However, if New_Thd is smaller than Thd, the battery provided in the main module Mm may be charged by the battery provided in the user module Um in operation 711. Here, the amount to be charged to the battery in the user module Um by the battery in the main module Mm may be expressed by Equation 4 below, which can be derived from Equation 3 below.

At first, the remaining amounts of battery power of the batteries may be adjusted with reference to Thd as expressed by Equation 3 below.

$$Thd = (\text{current remaining battery amount of } Mm \text{ amount-to-be-charged of } Um) / (\text{current remaining battery amount of } Um + \text{amount-to-be-charged of } Um) \quad \text{Equation 3}$$

Arranging the charged amount of Um in Equation 3, the amount-to-be-charged of Um can be expressed by Equation 4 below.

$$\text{Amount-to-be-charged of Um} = \frac{(\text{remaining battery amount of Mm} - Thd \times \text{remaining battery amount of Um})}{(Thd+1)} \quad \text{Equation 4}$$

Meanwhile, the amount to be charged to the battery in the main module by the battery in the user module in the operation 711 may be expressed by Equation 6 below, which can be derived from Equation 5 below.

At first, the remaining amounts of battery power of the batteries may be adjusted with reference to Thd as expressed by Equation 5 below $$Thd = \frac{(\text{current remaining battery amount of Mm} + \text{amount-to-be-charged of Mm})}{(\text{current remaining battery amount of Um} - \text{amount-to-be-charged of Mm})} \quad \text{Equation 5}$$

Arranging the amount-to-be-charged of Mm (i.e., amount to be charged to the battery of the main module Mm by the battery of user module Um) in Equation 5, the amount-to-be-charged of Um can be expressed by Equation 6 below.

$$\text{Amount-to-be-charged of Mm} = \frac{(Thd \times \text{remaining amount of Um remaining amount of Mm})}{(Thd+1)} \quad \text{Equation 6}$$

If New_Thd arrives at the target value, Thd, through the inter-charging, operations to maintain Thd at a proper level are repeatedly executed by turning off the power supply, or periodically confirming the current charged condition (New_Thd) until the main module and the user module are separated from each other.

However, if the inter-charging between the batteries of the main module and the user module are repeatedly executed, heat may be generated and power may be lost due to frequent charging. Thus, the present general inventive concept proposes a method of executing the inter-charging between the batteries of the main module and the user module with reference to at least one of the threshold charging range or the number of threshold charging times.

Figure 8:
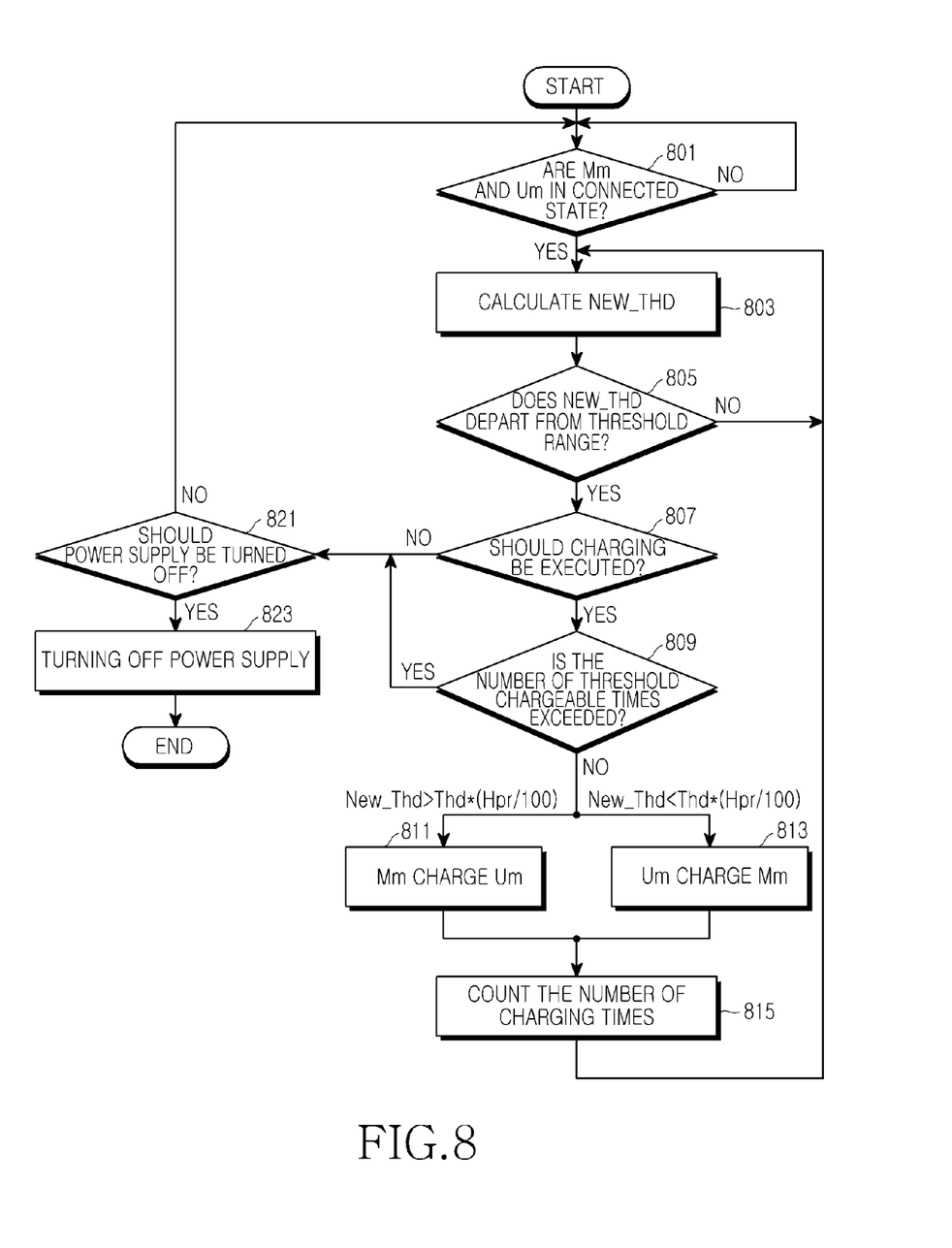
FIG. 8 is a flowchart showing a method of executing inter-charging of batteries between the main module and the user module in a mobile terminal according to another embodiment of the present general inventive concept.

FIG. 8 is a flowchart showing a method of executing the inter-charging of the main module and the user module in a mobile terminal according to another embodiment of the present general inventive concept. The process represented in FIG. 8 corresponds to a battery charging method to prevent heat generation and power loss caused by battery charging.

At first, in operation 801, the connection state between the main module and the user module is determined. If the main module and the user module are in a separated state, or are disconnected from each other, it may be determined in operation 821 whether the a respective power supply of the respective modules should be turned off. The determination may be made based on a user command, a predetermined command or setting, a power level of the connected battery, etc. If it is determined that the power should be such off, it is shut off in operation 823. Otherwise, the process continues in operation 801 to detect whether the modules are connected.

On the other hand, if the main module and the user module are in the connected state, in operation 803, New_Thd is calculated, wherein New_Thd indicates a current remaining amount ratio changed as the batteries of the main module and the user module are used.

Then, in step 805, it is determined whether the calculated value of New_Thd departs from the threshold range of remaining battery amount. If it is determined that New_Thd does not depart from the threshold range of remaining battery amount, the process proceeds to the operation 803.

If it is determined that New_Thd departs from the threshold range of remaining battery amount, in operation 807, it is determined whether to execute the inter charging between the batteries. If it is determined not to execute the inter-charging, the process proceeds to operation 821, discussed above.

If it is determined that the batteries should inter-charge, it is determined in operation 809 whether a charging threshold number has been exceeded. The charging threshold number represents the highest number of charge operations that may be performed on the batteries within a predetermined time period. If it is determined that the number of threshold chargeable times in the operation 809, the process proceeds to operation 821, but if the number of threshold times is not exceeded, the process proceeds to operation 811 or operation 813, so that the inter-charging between the batteries may be executed.

After the inter-charging is completed, the number of charging times is counted and the process proceeds to operation 803.

By providing a permissible range (pr) (%) for the reference value to initiate the inter-charging, Thd, the range of Thd is extended. That is, since the inter-charging can be initiated only when the range of Thd±pr (%) is exceeded, the mobile terminal is robust against the change of charged amount, and heat generation and power loss caused by frequent charging can be prevented.

In addition, the number of times is limited by presetting the number of threshold chargeable times. Here, the number of threshold chargeable times may be the number of chargeable times per hour. For example, if the number of threshold chargeable times is preset to five (5) times per hour, the number of charging times is limited in such a manner that additional charging is prevented when the number of charging times monitored for one hour is five or more, whereby frequent charging can be prevented.

That is, by defining a permissible range pr or limiting the number of charging times, it is possible to reduce heat generated at the time of charging or power loss. These two measures can be used concurrently, or in the reversed sequence. It is also possible to use only one of two measures.

Since the batteries are individually provided in the main module and the user module, which are separated from each other in a mobile terminal according to the functional characteristics of the mobile terminal, and the batteries are compatibly used or inter-charged with each other according to the present general inventive concept, the unbalance of battery power between the main module and the user module can be complemented.

While the present general inventive concept has been shown and described with reference to certain exemplary embodiments thereof, it will be understood by those skilled in the art that various changes in form and details may be made therein without departing from the spirit and scope of the general inventive concept as defined by the appended claims.

What is claimed is:

1. A separable mobile terminal device comprising:
   a main module to execute main functions in order to drive the mobile terminal; and
   a user module to receive and transmit at least one of visual and aural signals,
   wherein at least one of the main module and the user module has a control unit to determine whether to execute the interworking between the main module and the user module depending on whether the main module and the user module are connected, and whether the interworking between the main module and the user module is required, wherein each of the main module and the user module has an interface unit to enable data transmission/reception, and a battery to supply driving power, wherein each of the main module and the user module has a connection means, so that the main module and the user module can be connected with or separated from each other through the connection means, and wherein when connected, the control unit limits charging of each battery of the main module and the user module based on at least one predetermined condition, to reduce heat in the mobile terminal device.

2. The mobile terminal device as claimed in claim 1, wherein when the main module and the user module are connected, the control unit compares the remaining battery amount ratio with a predetermined threshold, and controls inter-charging of the batteries provided in the main module and the user module.

3. The mobile terminal device as claimed in claim 1, wherein the interface unit enables data transmission/reception between the main module and the user module through any one of wireless communication and wired communication.

4. A method of executing interworking between a main module and a user module in a mobile terminal, the main module and the user module being separable from each other, the main module to execute principal functions to drive the mobile terminal, and the user module to transmit and receive at least one of visual and aural signals, the method comprising:

determining a connection state between the main module and the user module;

determining whether the interworking between the main module and the user module is required, depending on an operation request input by a user; and determining, by a control unit of at least one of the main module and the user module, whether to execute the interworking between the main module and the user module depending on the connection state and the determination as to the requirement of the interworking, and wherein, when the main module and the user module are connected, the control unit limits charging of each battery of the main module and the user module based on at least one predetermined condition, to reduce heat in the mobile terminal.

5. The method as claimed in claim 4, wherein if the operation requested by the user does not require the interworking between the main module and the user module, the method further comprises:

executing the requested operation with the user module.

6. The method as claimed in claim 4, wherein if the operation requested by the user requires the interworking between the main module and the user module, and the main module and the user module are separated from each other, the method further comprises:

turning on the interworking between the main module and the user module.

7. The method as claimed in claim 4, wherein if the operation requested by the user does not require the interworking between the main module and the user module, and the main module and the user module are separated, the method further comprises:

turning off the interworking between the main module and the user module.

8. The method as claimed in claim 4, wherein if the main module and the user module are connected, the method further comprises:

calculating the remaining battery amount ratio of the batteries which are provided in the main module and the user module, respectively; and calculating an inter-charging amount of the batteries on the basis of the calculated current remaining battery amount ratio, and a preset threshold value.

9. The method as claimed in claim 8, wherein when the battery provided in the user module is charged by the battery provided in the main module, the inter-charging amount is defined by an equation, $$\text{Amount-to-be-charged of } Um = (\text{remaining battery amount of } Mm - Thd \times \text{remaining battery amount of } Um)/(Thd+1),$$

wherein the remaining battery amount of Um means the remaining amount of the battery provided in the user module, the remaining battery amount of Mm means the remaining amount of the battery provided in the main module, and Thd means a preset threshold value.

10. The method as claimed in claim 8, wherein when the battery provided in the main module is charged by the battery provided in the user module, the inter-charging amount is defined by an equation, $$\text{Amount-to-be-charged of } Mm = (Thd \times \text{remaining battery amount of } Um - \text{remaining battery amount of } Mm)/(Thd+1),$$

wherein the remaining battery amount of Um means the remaining amount of the battery provided in the user module, the remaining battery amount of Mm means the remaining amount of the battery provided in the main module, and Thd means a preset threshold value.

11. The method as claimed in claim 8, wherein the preset threshold may be any one of a specific constant and a specific range.

12. The method as claimed in claim 8, further comprising:

executing inter-charging between the batteries provided in the main module and the user module, depending on the number of threshold chargeable times which is preset; and counting the number of charging times after the inter-charging is executed.

13. A mobile device, comprising:

a main module including a battery to power the main module and a first connector; and a user module including a battery to power the user module and a second connector to connect to the first connector, wherein the user module includes hardware components to receive as input and to output at least one of audio and visual signals from/to a user, and the main module includes hardware components to receive, process, and store data at least one of the main module and the user module including a controller to control operation of the main module and the user module based on received commands, and wherein, when connected, the controller limits charging of each battery of the main module and the user module based on at least one predetermined condition, to reduce heat in the mobile device.

14. The mobile device according to claim 13, wherein the main module includes neither audio nor visual input/output hardware to receive input from or to output signals to a user.

15. The mobile device according to claim 13, wherein the controller controls a transfer of power between the main module battery and the user module battery within a predetermined remaining voltage range and a measured number of charging operations.

16. The mobile device according to claim 15, wherein the controller determines whether to transfer power between the main module battery and the user module battery by comparing a threshold power ratio to a measured power ratio, and
wherein the threshold power ratio is a predetermined number representing a ratio of power of the main module to power of the user module, and
the measured power ratio is a measured ratio of power of the main module battery to power of the user module battery.

17. The mobile device according to claim 16, wherein the controller adjusts the threshold power ratio based on an operation being executed by the mobile device.

18. The mobile device according to claim 15, wherein the controller determines whether to transfer power between the main module battery and the user module battery by comparing a threshold number of charging operations to the measured number of charging operations, and
wherein the threshold number of charging operations is a predetermined number of charging operations between the main module battery and the user module battery in a predetermined period of time, and
the measured number of charging operations is a measured number of charging operations between the main module battery and the user module battery within the predetermined period of time.

19. The mobile device according to claim 18, wherein the controller adjusts the threshold number of charging operations based on an operation being executed by the mobile device.

20. The mobile device according to claim 13, wherein the main module further comprises:
a controller to control operation of at least the main module;
memory; and
an antenna to transmit wireless signals.

21. The mobile device according to claim 13, wherein the user module further comprises:
a control unit to control operation of at least the user module;
a camera;
a visual display; and
at least one audio transmitter to transmit and receive audio signals.

22. The mobile device according to claim 13, wherein:
the user module has a front surface including at least one of said hardware components to receive/transmit at least one of audio and visual signals from/to a user and a rear surface opposite the front surface, the rear surface including the second connector; and
the main module has a first surface including the first connector and having a shape corresponding to a shape of the rear surface of the user module such that when the user module is connected to the main module via the first and second connectors, the rear surface of the user module fits onto the first surface of the main module.

23. A method of charging a first and second battery, the method comprising:
measuring a ratio of power of a first battery to power of a second battery;
comparing, by a control unit of at least one of the main module and the user module, the measured ratio to a predetermined threshold ratio; and
charging one of the first and second battery with the other of the first and second battery based on an outcome of the comparison when the ratio of the power of the first battery to the power of the second battery is within a predetermined permissible range (pr) (%) of the predetermined threshold ratio to extend the range of the predetermined threshold ratio, and
wherein, when connected, the control unit limits charging of each battery of the main module and the user module based on at least one predetermined condition, to reduce heat.

24. The method according to claim 23, further comprising:
when the measured ratio is greater than the threshold ratio, charging the first battery with the second battery, and
when the measured ratio is less than the threshold ratio, charging the second battery with the first battery.

25. The method according to claim 23, wherein the threshold ratio includes a first ratio value and a second ratio value less than the first ratio value, the method further comprising:
when the measured ratio is greater than the first ratio value, charging the first battery with the second battery, and
when the measured ratio is less than the second ratio value, charging the second battery with the first battery.

26. The method according to claim 23, wherein the threshold ratio is determined by a user.

27. The method according to claim 23, wherein the threshold ratio is determined by an operation being executed by a device connected to at least one of the first and second batteries.

28. The method according to claim 23, wherein the first battery is connected to a user module of a mobile device and the second battery is connected to a main module of the mobile device, the method further comprising:
detecting whether the user module is connected to the main module before measuring the ratio of power of the first battery to the ratio of power of the second battery.

29. The method according to claim 23, further comprising:
comparing a number of charging operations performed within a predetermined time period to a predetermined number; and
performing the charging operation when the number of charging operations performed is less than the predetermined number.

30. The method according to claim 29, wherein the predetermined number is set by a user.

31. The method according to claim 29, wherein the predetermined number is adjusted based on an operation being performed by a device connected to at least one of the first and second batteries.

32. A method of charging a first and second battery, the method comprising:
comparing a number of charging operations performed between a first battery and a second battery within a predetermined time period to a predetermined number;
measuring a ratio of power of a first battery to power of a second battery;
comparing, by a control unit of at least one of the main module and the user module, the measured ratio to a predetermined threshold ratio; and
performing a charging operation between the first battery and the second battery when the number of charging operations performed is less than the predetermined number and the ratio of the power of the first battery to the power of the second battery is within a predetermined permissible range (pr) (%) of the predetermined threshold ratio to prevent heat generation and power loss and to extend the range of the predetermined threshold ratio, and wherein, when connected, the control unit limits charging of each battery of the main module and the user module based on at least one predetermined condition, to reduce heat.

33. A method of operating a mobile device including a user interface portion having a first battery, and a support portion having a second battery, the user interface portion being separable from the support portion, the method comprising:
  receiving a command from a user via the user interface portion;
  determining whether an operation corresponds to the command requires use of the support portion;
  if the operation does not require use of the support portion, executing the command with only the user interface portion, one of the support portion and the user interface portion including a controller to control a transfer of power between the second battery and the first battery based on comparing a threshold power ratio to a measured power ratio, and wherein, when connected, the controller limits charging of each battery of the main module and the user module based on at least one predetermined condition, to reduce heat in the mobile device.

34. The mobile terminal of claim 1, wherein at least one predetermined condition includes excess of a predetermined remaining voltage range and a number of charging operations.

* * * * *